US009924766B2

(12) United States Patent
de Iuliis et al.

(10) Patent No.: US 9,924,766 B2
(45) Date of Patent: Mar. 27, 2018

(54) ATTACHMENT MECHANISM FOR A WEARABLE DEVICE

(71) Applicant: Apple Inc., Cupertino, CA (US)

(72) Inventors: Daniele de Iuliis, Cupertino, CA (US); Michael J. Webb, Scotts Valley, CA (US)

(73) Assignee: APPLE INC., Cupertino, CA (US)

( * ) Notice: Subject to any disclaimer, the term of this patent is extended or adjusted under 35 U.S.C. 154(b) by 13 days.

(21) Appl. No.: 15/258,127

(22) Filed: Sep. 7, 2016

(65) Prior Publication Data
US 2017/0079386 A1 Mar. 23, 2017

Related U.S. Application Data

(60) Provisional application No. 62/220,131, filed on Sep. 17, 2015.

(51) Int. Cl.
G04B 37/14 (2006.01)
A44C 5/12 (2006.01)
A44C 5/00 (2006.01)
A44C 5/14 (2006.01)
A44C 5/10 (2006.01)
G06F 1/16 (2006.01)

(52) U.S. Cl.
CPC ............. *A44C 5/12* (2013.01); *A44C 5/0007* (2013.01); *A44C 5/105* (2013.01); *A44C 5/147* (2013.01); *G04B 37/1486* (2013.01); *G06F 1/163* (2013.01); *G06F 1/1637* (2013.01)

(58) Field of Classification Search
CPC .......... G06F 1/16; G06F 1/163; G06F 1/1637; G04B 37/14; G04B 37/1486; A44C 5/0007; A44C 5/147; A44C 5/105
USPC ...................................................... 224/174
See application file for complete search history.

(56) References Cited

U.S. PATENT DOCUMENTS

| 300,286 | A | * | 6/1884 | Salisbury | A44C 5/12 224/174 |
| 2,008,253 | A | * | 7/1935 | Klempt | C10K 1/124 423/236 |
| 2,009,254 | A | * | 7/1935 | Feid | A44C 5/14 224/174 |
| 2,780,400 | A | * | 2/1957 | Lancaster | G04B 37/12 224/174 |
| 3,099,908 | A | * | 8/1963 | Wolfinger | A44C 5/08 267/69 |
| 3,416,305 | A | * | 12/1968 | Rieth | A44C 5/04 224/175 |
| 3,587,226 | A | * | 6/1971 | Rieth | A44C 5/04 59/79.1 |
| 3,601,977 | A | * | 8/1971 | Kunzmann | A44C 5/04 224/175 |

(Continued)

*Primary Examiner* — Sean Kayes
(74) *Attorney, Agent, or Firm* — McDermott Will & Emery LLP

(57) ABSTRACT

An attachment mechanism that can be used to attach a portable or wearable electronic device to a user. The attachment mechanism may include a band strap having multiple links that are configured to wrap around a user's wrist. The links of the band may be spring biased and allow the band to be secured to a wrist or other object as it transitions from an open to a closed position. The amount of spring bias may be adjusted or specially configured to attach the device comfortably yet securely.

16 Claims, 7 Drawing Sheets

(56) References Cited

U.S. PATENT DOCUMENTS

| | | | | |
|---|---|---|---|---|
| 3,677,450 A | * | 7/1972 | Hodgson | A44C 5/0015 |
| | | | | 224/175 |
| 3,964,252 A | * | 6/1976 | Ho | A44C 5/107 |
| | | | | 59/80 |
| 6,014,793 A | * | 1/2000 | Howald | A44C 5/147 |
| | | | | 24/115 G |

* cited by examiner

ATTACHMENT MECHANISM FOR A WEARABLE DEVICE

CROSS-REFERENCE TO RELATED APPLICATION(S)

This application is a nonprovisional patent application of and claims the benefit of U.S. Provisional Patent Application No. 62/220,131, filed Sep. 17, 2015 and titled "Attachment Mechanism for a Wearable Device," the disclosure of which is hereby incorporated herein by reference in its entirety.

FIELD

The embodiments disclosed herein relate to mechanisms for attaching a device to a user and, in particular, the embodiments relate to an attachment band with multiple spring-loaded links that are configured to wrap around a user's wrist.

BACKGROUND

Advances in portable computing and electronics have led to increased use and portability of electronic devices. Portable devices such as watches, smart watches, smart phones, and the like have become more popular in recent years and there is an increased desire to carry these devices at all times. Users may carry these devices while moving in various environments during their daily activities. Users may carry the devices using a pocket in an article of clothing, a handbag, a briefcase, or other similar carrying technique.

For devices that are sufficiently small and lightweight, it may be advantageous to carry the device directly on the body of the user. For example, a wrist band, arm band, or lanyard may be used to attach a device to a user. Some traditional attachment techniques include the use of a flexible strap (e.g., leather) that wraps around the body part of the user and is attached to the device or a mating strap using a clasp or buckle. While traditional attachment techniques may adequately secure the device, they may lack sufficient adjustability, comfort, and/or visual appeal.

SUMMARY

The disclosed embodiments are directed to an attachment mechanism to secure an electronic device to a user or to otherwise securely transport a portable electronic device. Some aspects of the attachment mechanism may offer functional and aesthetic advantages over some traditional mechanisms.

The attachment mechanism may be made from a series of links that are joined by a spring-loaded or spring biased pivotal connection. The series of links may be configured to conform to the wrist or other body part of a user and fit more comfortably than some traditional attachment techniques. Adjacent links may be biased in a direction to wrap around a wrist of a user or another object. The amount of the bias may be different in different regions of the wristband such that the band may fit securely and comfortably around the wrist of the user. In some embodiments, the bias may be adjustable to allow the user to determine the most comfortable fit of the wristband.

Some example embodiments are directed to an attachment mechanism including a housing of a portable electronic device and a pair of band straps attached to the housing and configured to transition between a closed position securing the portable electronic device to the user and an open position releasing the portable electronic device from the user. Each band strap may include a first group of links attached to the housing. The first group of links may include a first pivotal connection coupling a first pair of links in the first group of links and including a first biasing member configured to exert a first biasing torque between the pair of links. A second group of links may be attached to the first group of links and may include a second pivotal connection coupling a second pair of links in the second group of links and a second biasing member configured to exert a second biasing torque that is less than the first biasing torque. In some embodiments, one or both of the first and second pivotal connections are removable.

In some embodiments, the attachment mechanism includes a third group of links attached to the second group of links. The third group of links may include a third pivotal connection coupling a third pair of links and including a third biasing member configured to exert a third biasing torque that is less than the second biasing torque.

In some embodiments, the attachment mechanism is a watch band and the portable electronic device is a watch. Each link may be formed from a metal material. In some cases, each link is formed from a closed loop of tubular material.

In some embodiments, each band strap of the pair of band straps is attached to the housing at a fixed end. Each band strap may also be configured to wrap around the user's wrist at a free end. In some embodiments, when the attachment mechanism is in the closed position, the free ends of the pair of band straps define a gap.

In some embodiments, the first group of links is attached to the housing at a fourth pivotal connection using a fourth biasing member configured to exert a fourth biasing torque that is greater than the first biasing torque.

In some embodiments, the first pivotal connection comprises a pivot pin joining the first pair of links. The biasing member may include a torsional spring disposed partially about the pivot pin and coupled to each link of the pair of links. In some embodiments, the first biasing member includes a leaf spring. The leaf spring may be coupled to each of the first pair of links. The first biasing torque may be caused by a bending of the leaf spring. In some embodiments, the first pivotal connection includes a pair of clamping elements that clamp to a first end of the leaf spring. The pair of clamping elements may attach the first end of the leaf spring to one link of the first pair of links.

In some embodiments, for one band strap of the pair of band straps, each link is coupled using a biasing member configured to exert a biasing torque that is different than other biasing members of the one band strap.

Some example embodiments are directed to an articulated strap for coupling a device to a user. The articulated strap may include a first link that is pivotally attached to a device housing using a first pivot and a first biasing member. A group of intermediate links may be pivotally engaged with the first link. A third link may be pivotally engaged with the group of intermediate links using a second pivot and a second biasing member. The first biasing member may be configured to exert a first torque that is greater than a second torque of the second biasing member. In some embodiments, the articulated strap is configured to move between an open position and a second, closed position. The first biasing member and the second biasing member may be configured to bias the articulated strap toward the closed position.

In some embodiments, the first link is coupled to the device housing using a toggling pivot. The toggling pivot may be configured to bias the strap toward an open position when positioned past an opening threshold. The toggling pivot may also be configured to bias the strap toward a closed position when positioned past a closing threshold.

In some embodiments, each link of the articulated strap is joined to an adjacent link using a toggling pivot. The toggling pivots may be configured to bias the strap toward an open position when positioned past an opening threshold and configured to bias the strap toward a closed position when positioned past a closing threshold.

Some example embodiments are directed to a method for making an attachment mechanism. A first link may be pivotally connected to a second link with a first biasing member. The second link may be pivotally connected to a third link with a second biasing member. The third link may be pivotally coupled to a fourth link with a third biasing member. The attachment mechanism may be attached to a housing of a wearable device. In some embodiments, the first biasing member has a biasing torque that is greater than the third biasing member.

In some embodiments, pivotally connecting the first link to the second link includes attaching the first link to the second link using a pivot and coupling the first biasing member to the first and second links. In some embodiments, the first biasing member is a leaf spring and pivotally connecting the first link to the second link includes attaching a first end of the leaf spring to the first link and a second end of the leaf spring to the second link. In some embodiments, a biasing torque is adjusted between at least one pair of adjacent links.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
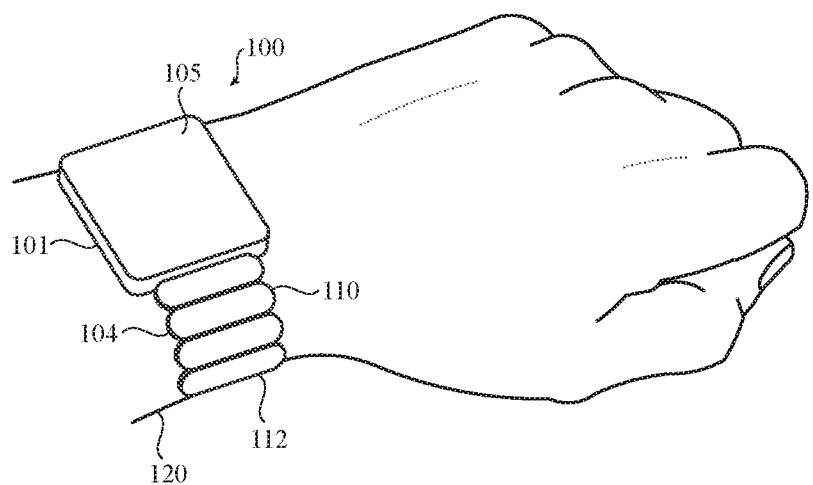
FIGS. 1A-1B show an example device attached to a user using an attachment mechanism.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

These and other embodiments are discussed below with reference to FIGS. 1-8. However, those skilled in the art will readily appreciate that the detailed description given herein with respect to these Figures is for explanatory purposes only and should not be construed as limiting.

The following disclosure is directed to embodiments that include an attachment mechanism for securing a device to a user. The attachment mechanism may include a pair of articulated straps (band straps that are configured to move between an open and closed position. In a closed position, the attachment mechanism may be configured to wrap around a body part of a user, such as a wrist or arm. In an open position, the attachment mechanism may be removed from the body part and detached from the user. The articulated straps may each be formed from a series of links that are pivotally coupled to each other. The pivotal connections or couplings may include a pivot (e.g., a pivot pin or other hinge) and a biasing member. In some cases, the pivot and the biasing member are formed by a single component. The biasing member may be configured to produce a biasing torque or force that biases the articulated strap toward a closed position.

In some embodiments, the torque of the biasing members are configurable and may vary along the length of the articulated strap. For example, the biasing torque provided by links near the housing of the device may be greater than (or stronger than) the biasing torque provided by links further away from the housing. The amount of biasing torque may be configured to provide a secure attachment without pinching or exerting excessive clamping forces on the user's wrist or arm. In some cases, the biasing torque or clamping force is adjustable either through mechanical adjustment or through replacement of a biasing member or element. Accordingly, the clamping force provided by an attachment mechanism may be specially configured for a particular user or a particular use.

In some embodiments, the pivotal connections may include a dampening element to dampen the pivotal movement between the links. In some embodiments, a clutching mechanism may be used to restrict or stop the motion between the links until an external force is applied. For example, the attachment mechanism may be configured to maintain an open position until a user clamps or closes the attachment mechanism around the user's wrist. Additionally or alternatively, the attachment mechanism may include a toggling pivot that is configured to bias the strap toward an open position when positioned past an opening threshold and configured to bias the strap toward a closed position when positioned past a closing threshold.

Figure 1B:
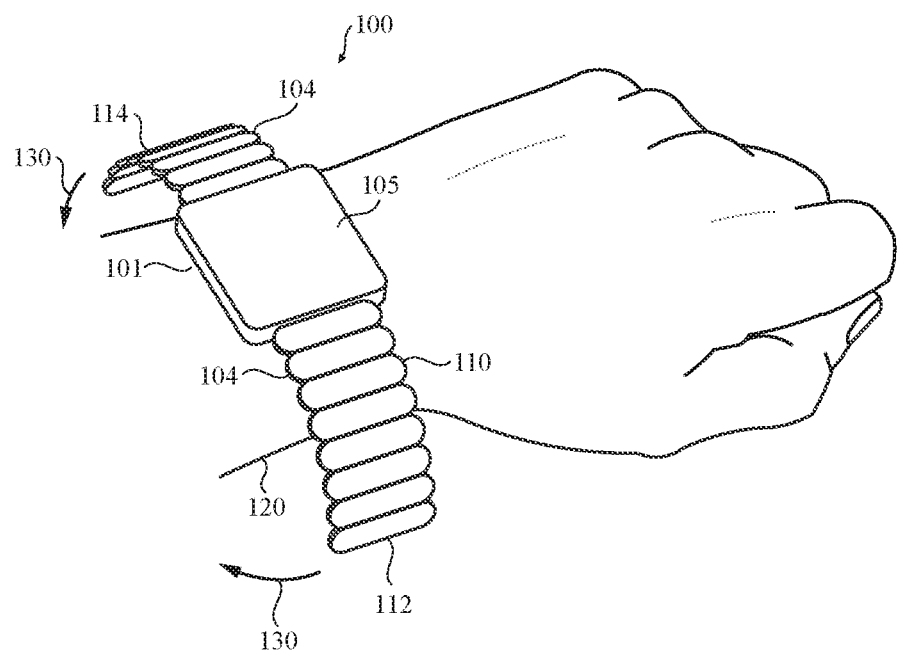

FIGS. 1A-1B depicts an example device 100 (e.g., a wearable device) including an attachment mechanism 110. In this example, the attachment mechanism 110 includes a pair of band straps: right strap 112, and left strap 114. Each of the straps 112, 114 are formed from a series of articulating segments or links 104 that are pivotally coupled to each other. The straps 112, 114 may transition or move between a closed position (shown in FIG. 1A) and an open position (shown in FIG. 1B). Collectively, the straps 112, 114 may be referred to as an articulating strap, articulating band, watch strap, watch band, or simply a strap or a band.

As shown in FIGS. 1A-1B, each band strap 112, 114 of the pair of band straps may be attached to the housing 101 at a fixed end and configured to wrap around the user's wrist 120 at a free end. As shown in FIG. 1A, when the attachment mechanism 110 is in the closed position, the free ends of the pair of band straps may define or be separated by a gap. In some embodiments, the free ends of the band straps 112, 114 touch or nearly touch when the attachment mechanism 110 is in the closed position. In the present example, the attachment mechanism 110 is configured to attach the device 100 to the user 120 without using a clasp, buckle, or similar mechanism to join the free end of the right strap 112 with the free end of the left strap 114.

One or more pairs of links 104 may include a biasing member, such as a spring, for biasing the straps 112, 114 into the closed position to secure or attach the device 100 to the user 120. As described in more detail below with respect to FIG. 3, the biasing members may be configured to provide a biasing torque that may vary along the length of each strap 112, 114. By varying the biasing torque, the attachment mechanism 110 may provide a secure attachment without undue pinching or clamping on the user's wrist 120. In one non-limiting example, the biasing torque between each link becomes lighter as the links are further from the housing 101 of the device 100.

The straps 112, 114 may be configured to move between an open position and a closed position, as indicated by arrows 130. The biasing torque between the links 104 of the straps 112, 114 may be sufficient to secure the device 100 to the user's wrist 120 while the attachment mechanism 110 is in the closed position. To disengage or remove the device 100, the user may pull the attachment mechanism 110 away from the user's wrist 120 to move the attachment mechanism 110 into an open position. The pulling force provided by the user generally is greater than the biasing torque provided by the pivotal connection between the links 104.

In some cases, the pivotal connections may include one or more toggling pivots. The toggling pivots may be configured to bias the straps 112, 114 toward an open position when positioned past an opening threshold, and may be configured to bias the straps 112, 114 toward a closed position when positioned past a closing threshold. In this way, the straps 112, 114 may tend to remain in either an open or closed position until acted on or moved by the user (or other external force). Alternatively or additionally, the pivotal connections may include a damping element or damping mechanism to resist or dampen pivotal motion between adjacent pairs of links 104.

The links 104 may be formed from a metal, plastic, ceramic, or other suitable material. While the links 104 are depicted as being generally oval in shape, the links 104 may be rectangular, circular, polygonal, or any one of a variety of other types of shapes. In the present example, the links 104 all have approximately the same shape. However, in alternative embodiments, the shape of the links 104 may vary along the length of the straps 112, 114. In some embodiments, one or more of the links 104 may be removably attached from an adjacent link 104 to allow for an adjustable length strap 112, 114 to fit different sized wrists. In some embodiments, the entire strap 112, 114 may be removably coupled to the housing 101 to facilitate band replacement or use of multiple, alternative band styles.

In the example depicted in FIGS. 1A-1B, the device 100 is illustrated as, but not limited to, a wearable device that is attached to the wrist 120 of a user. The device 100 may include a mechanical watch, an electronic watch, a health monitoring device, a portable media player, or the like. A mechanical or electronic watch may be configured to function as a timekeeping device by displaying the current time, elapsed time, or other timekeeping function. An electronic watch may include electronic components including, for example, circuitry and processing units that are configured to perform the various functions of the device. While FIGS. 1A-1B depict the device 100 as being attached to the user's wrist 120, the attachment mechanism 110 may be used to attach the device 100 to other body parts of the user or to other devices, structures, or objects.

The device 100 includes a housing 101 that defines an opening. A display 105 is at least partially disposed within the opening of the housing 101 and may be covered by a crystal, cover glass, or other similar protective element. The display 105 may include a light emitting diode, a liquid crystal display, an organic light emitting diode display, or other type of display element. In some embodiments, the device 100 includes a purely mechanical (non-electronic) display such as a traditional watch face.

The housing 101 may be formed from one or more separate components and serves as a protective enclosure for the internal components of the device 100. The housing 101 may enclose a battery, mechanisms, electronics, processors, and other internal components of the device 100. The housing 101 may also provide for one or more user input devices such as a crown, dial, button, slide, and the like. The user input devices may be configured to receive a user input. For example, the device may include a crown or dial that is configured to receive a rotary and/or translational user input to control one or more aspects of the device 100.

Figure 2:
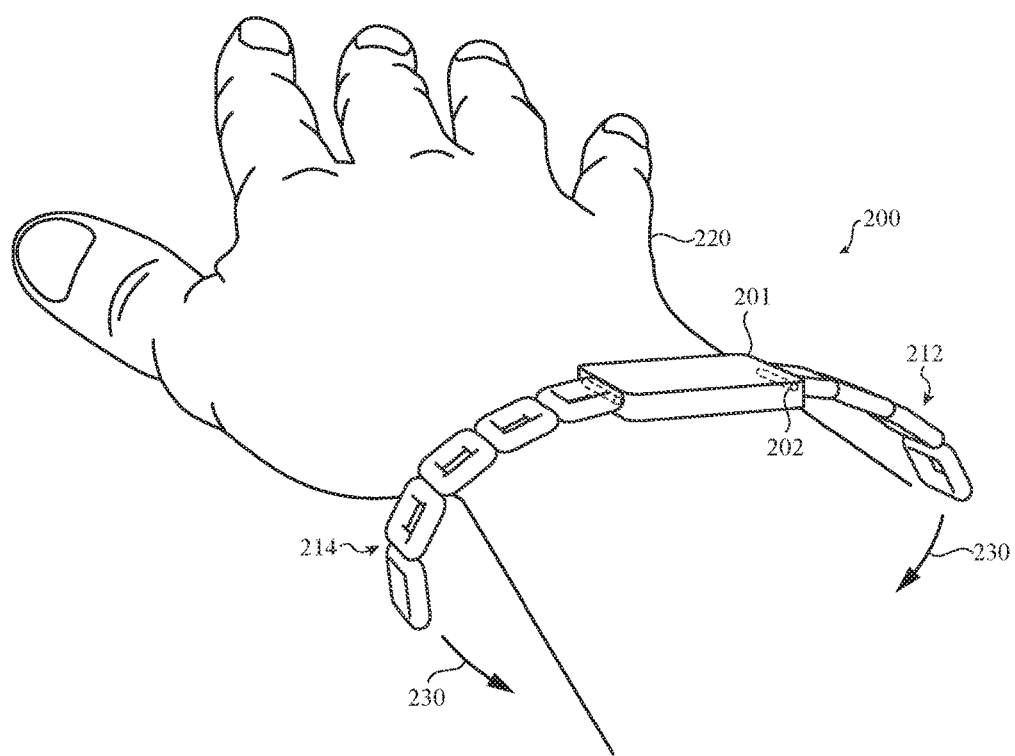
FIG. 2 shows another example attachment mechanism.

FIG. 2 depicts another example device 200 having attachment mechanism 210 used to attach the device 200 to a user (e.g., user's wrist 220). Similar to the previous example, the attachment mechanism 210 includes two straps 212, 214 that are formed by a series of articulating links 204 that are pivotally coupled to each other. Each of the pair of straps 212, 214 is attached to opposite sides of the housing 201 of the device 200. The straps 212, 214 may be pivotally and/or removably coupled or connected to the housing 201 using a pin, hinge, or other similar coupling joint. In the present embodiment, the straps 212, 214 are pivotally coupled to the housing 201 using the pivot pin 202. The pivotal connection between the straps 212, 214 and the housing 201 may include a biasing member that is configured to exert a biasing force or torque on the respective straps 212, 214.

Similar to the previous example, each of the links 204 may be coupled or connected via a pivotal connection that allows for a pivoting movement. Each pivotal connection may include a biasing member that provides a biasing force or torque to bias the straps 212, 214 from an open to a closed position. The biasing force or torque may cause the attachment mechanism 210 to snap or clamp around the user's wrist 220. An example closing movement is illustrated by arrows 230.

In the present example, the links 204 have a closed loop or hoop shape with an open center portion. Each link 204 may be formed from a closed loop of tubular material and connected to an adjacent link using a pivot pin, pivot hinge, or other type of pivotal connection. Example pivotal connections are described in more detail below with respect to FIGS. 5 and 6.

The pivotal connection or coupling between each of the links 204 provides the bias force to move the attachment mechanism 210 from the open to the closed position or to maintain the attachment mechanism 210 in the closed position. If the device 200 is attached to the user's wrist 220, the user may remove the device 200 by pulling the attachment mechanism 210 in the direction opposite to arrows 230 and away from the user's wrist 220 to move it into an open position. In some cases, the pivotal connections may include one or more toggling pivots. The toggling pivots may be configured to bias the straps 212, 214 toward an open position when positioned past an opening threshold, and may be configured to bias the straps 212, 214 toward a closed position when positioned past a closing threshold. In this way, the straps 212, 214 may tend to remain in either an open or closed position until acted on or moved by the user (or other external force).

Figure 3:
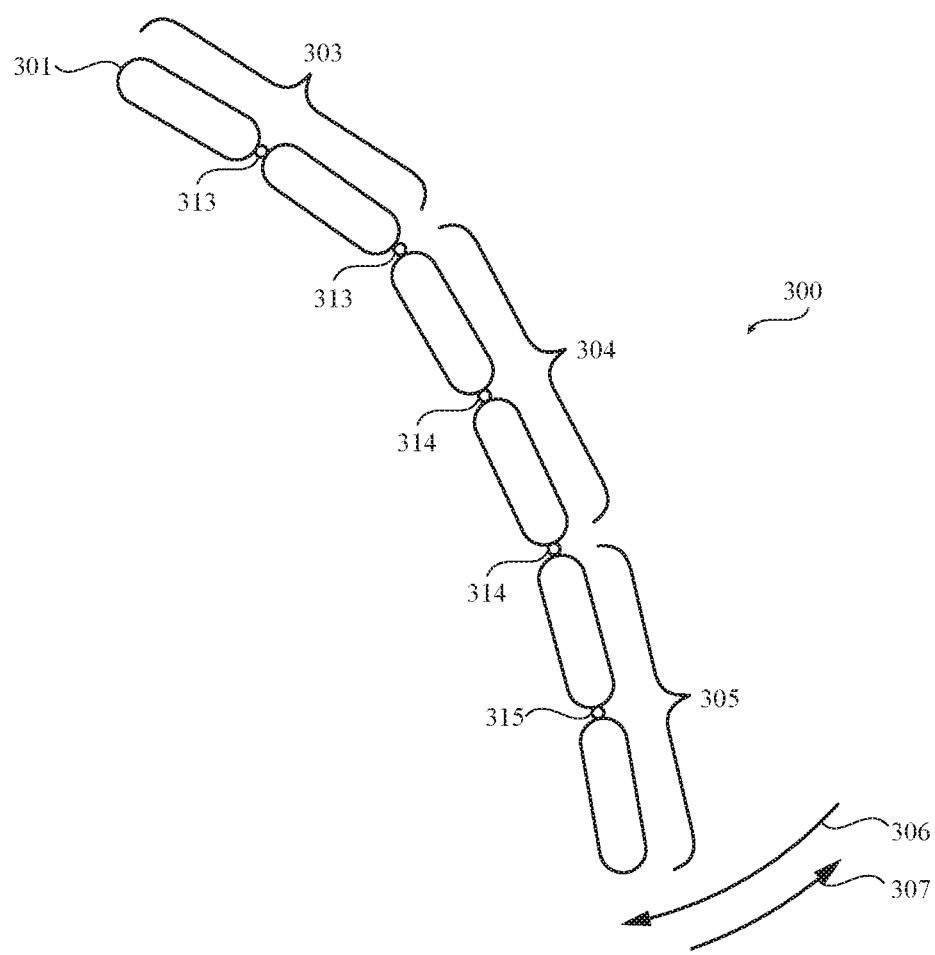
FIG. 3 shows a side view of a portion of an attachment mechanism.

FIG. 3 depicts a side view of an articulated strap 300. The articulated strap 300 may correspond to a portion of one of the straps described above with respect to FIGS. 1A, 1B, and 2. Similar to as described above with respect to the previous figures, the strap 300 may be connected to a housing at a first end and a second, opposite end may be configured to wrap around a user's wrist. Using two articulated straps 300 attached to opposite sides of a housing, the straps 300 may be configured to clamp or close around a user's wrist to secure a device to the user's body. The directional arrow 306 indicates the direction associated with a closing motion and the arrow 307 indicates the direction associated with an opening motion.

The articulated strap 300 is formed from a series of links 301 that are connected to each other by pivotal connections 313, 314, 315. The pivotal connections may be configured to bias the strap 300 in the direction 306 (associated with a closing or closed position of the strap 300). The pivotal connections 313, 314, 315 include a biasing member (not shown), which may provide a biasing torque for each of the pivotal connections 313, 314, 315. The biasing member may include a spring or other resilient component that is configured to produce a biasing torque between adjacent pairs of links 301. Example pivotal connections and example biasing members are described below with respect to FIGS. 5 and 6.

The biasing torque may vary along the length of the strap 300. In particular, the series of links 301 in the strap 300 may include multiple groups of links, each group including two or more links that are joined by a pivotal connection (313, 314, 315) having a different biasing torque. In the example of FIG. 3, the strap 300 includes three groups of links (303, 304, 305). Three groups of links are provided as one non-limiting example and an alternative design may include use fewer or more groups of links. A first group of links 303 is positioned at one end of the strap 300 and may include an end link 301 that may be used to attach the strap 300 to a housing of the device or other component. The first group of links 303 includes a first pivotal connection 313 coupling at least one pair of links 301 in the first group of links 303. Here, the first group of links 303 includes three links 301 joined together by two pivotal connections 313. Each pivotal connection 313 includes a first biasing member that is configured to exert a first biasing torque between the pair of links.

As shown in FIG. 3, the strap 300 includes a second group of links 304 that is attached to the first group of links 303. The second group of links includes a second pivotal connection 314 coupling at least one pair of links 301 in the second group of links 304. Here, the second group of links 304 includes three links 301 joined together by two pivotal connections 314. Each pivotal connection includes a second biasing member configured to exert a second biasing torque. In some embodiments, the second biasing torque of the second pivotal connection 314 is less than the first biasing torque of the first pivotal connection 313.

Similarly, a third group of links 305 may be attached to the second group of links 304 and may include a third pivotal connection 315 coupling at least one pair of links 301 in the third group of links 305. The third pivotal connection 315 may include a third biasing member that is configured to exert a third biasing torque that is less than the first and second biasing torques of the other two groups of links (303, 304).

The strength of the biasing torque provided by each pivotal connection 313, 314, 315 determines the amount of force that the articulated strap 300 exerts against a wrist or other body part or object around which a band is secured. In the current example, the biasing torque provided by pairs of links in group 303 may be stronger than in group 304 and the biasing torque in group 304 may be stronger than in group 305. In this configuration, the higher or stronger torque provided by the first and second groups of links (303, 304) may be configured to secure the device to the user's wrist. The lower or weaker torque provided by the third group of links 305 may be configured to wrap the strap 300 around the user's wrist in a comfortable manner without undue clamping or squeezing.

In an alternative embodiment, the biasing torque provided by the first group of links 303 may be weaker or lower than the torque provided by the second group of links 304, which in turn may be weaker or lower than the torque provided by the third group of links 305. In this embodiment, the stronger biasing force in region 305 may be desirable to more securely attach the strap 300 (and the device) around a user's wrist or around an object such as a pole or the handlebar of a bicycle or motorcycle.

The torque provided by the pivotal connections 313, 314, 315 may be due to a spring or other resilient element that is configured to produce an increasing biasing torque in response to a pivotal motion in the direction 307 (corresponding to an opening motion of the strap 300). Example spring-based pivotal connections are described below with respect to FIGS. 5 and 6. Additionally or alternatively, adjacent pairs of links include one or more magnetic elements that are configured to provide a centering and/or biasing torque between the pair of links. The adjacent links may, for example, include a pair of attracting magnets that tend to pull the adjacent links in the direction 306 (corresponding to a closing motion of the strap 300).

In some embodiments, each link 301 of the strap 300 is joined to an adjacent link 301 using a toggling pivot. The toggling pivots may be configured to bias the strap toward an open position when positioned past an opening threshold and bias the strap toward a closed position when positioned past a closing threshold. The toggling pivot may be formed from an over-center linkage or mechanism that toggles a biasing force when moved past an over-center position. For example, the toggling pivot may include a link or pair of opposing links that are configured to rotate away from an over-center position. In some embodiments, the toggling pivot may be provided by a pair of opposing magnets that tend to rotate the links away from an over-center position.

In some embodiments, the amount of rotation provided by each type of pivotal connection 313, 314, 315 may vary along the length of the strap 300. In particular, each pivotal connection 313, 314, 315 may include a hard stop configuration that limits the amount of rotation between adjacent links to a different amount. In some embodiments, the pivotal connection 313 may be configured to move through a greater amount of rotation than the pivotal connections 314 and 315. Similarly, the pivotal connection 314 may be configured to move through a greater amount of rotation than the pivotal connection 315. In an alternative embodiment, the pivotal connection 315 may be configured to rotate further than pivotal connection 314, which may be configured to rotate further than pivotal connection 313. The amount of rotation may also be adjustable by adjusting the position of hard stops between one or more pair of links.

In some embodiments, each pivotal connection 313, 314, 315 may include a dampening element or dampening mechanism for restricting or dampening a pivoting motion between adjacent pairs of links. In one example, a gear-driven dampening mechanism coupled to a fluidic or other type of damper may be integrated in one or more of the pivotal connections 313, 314, 315. In another example, a dampening element such as a washer or ring formed from a polymer material may be used to restrict or dampen the pivoting motion between adjacent links. In some embodiments, the amount of dampening varies along the length of the band 300 similar to as described above with respect to the biasing torque. That is, the dampening provided by the first group of links 303 may be greater than the dampening provided by the second group of links 304, and so on.

Figure 4:
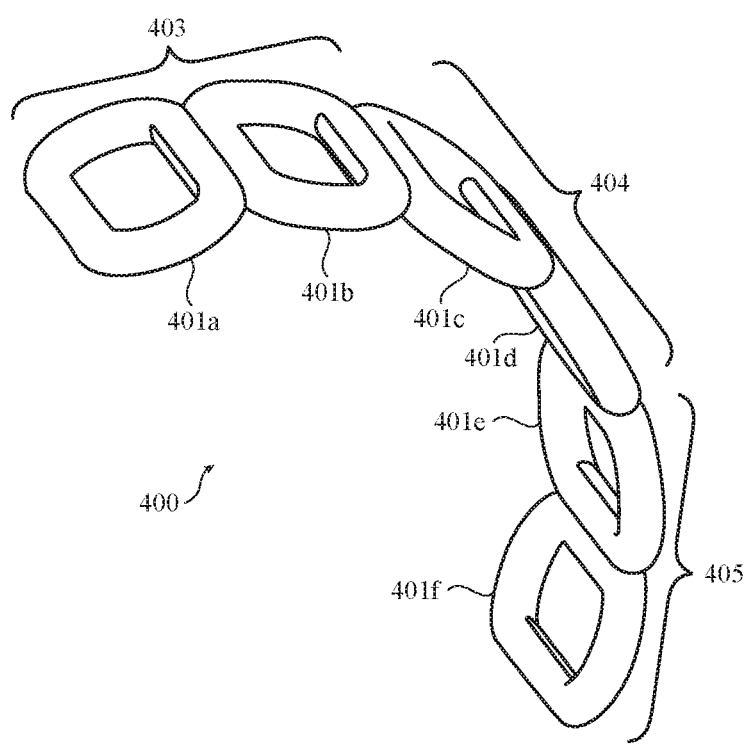
FIG. 4 shows a series of links used to form an attachment mechanism.
Figure 5:
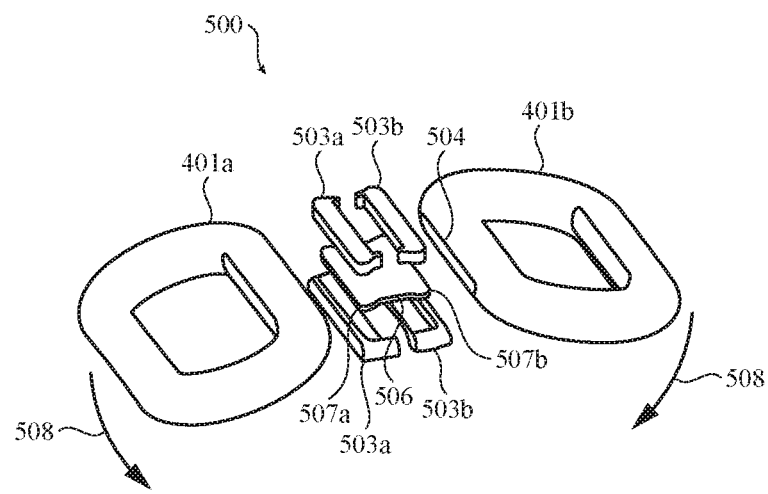
FIG. 5 shows an exploded view of a pivotal connection including a leaf spring.

FIGS. 4 and 5 depict an example articulating strap 400 formed from a series of links 401 that are pivotally coupled to each other. In particular, FIG. 4 depicts an assembled articulating strap 400 and FIG. 5 depicts an exploded view of a pair of adjacent links 401a-f and an example pivotal connection between them.

As shown in FIG. 4, the strap 400 is formed from multiple groups of links 403, 404, and 405. Similar to as described above with respect to FIG. 3, each group of links may provide a different biasing torque, clamping force, amount of rotation, dampening, or other variation of pivotal connection between adjacent links 401a-f. As described above with respect to FIG. 3, each group of links 403, 404, 405 may provide a biasing torque that increases along the length of the strap 400. Alternatively, one or more groups of links 403, 404, 405 may fixedly or rigidly couple adjacent links to each other. In one example, the strap 400 includes pivotal connections alternating or interspersed with rigid connections between adjacent links.

In general, the biasing torque provided by links closer to an attachment to a device housing may be increased as compared to the biasing torque between links that are further away. In one example, the first link 401a is configured to be pivotally attached to a device housing or other component using a first pivot and a first biasing member. A group of intermediate links 401b-e are pivotally engaged with the first link 401a. The link 401f may be pivotally engaged with the group of intermediate links 401b-e using a second pivot and a second biasing member. In some implementations, the first biasing member may be configured to exert a first torque that is greater than a second torque of the second biasing member. In some embodiments, the intermediate links 401b-e may be pivotally coupled to each other. Alternatively, one or more pairs of intermediate links 401b-e are fixedly or rigidly coupled to each other.

FIG. 5 depicts an exploded view of an example pivotal connection 500 between adjacent links 401a and 401b. In this example, the pivotal connection 500 includes leaf spring 506 that functions as both a biasing member and the pivot between the links 401a and 401b. In particular, the leaf spring 506 is configured to bend to provide a pivoting motion between the links 401a and 401b. The bending of the leaf spring 506 also produces the biasing torque between the links 401a, 401b. The leaf spring 506 may be formed from spring steel or other compliant material.

As shown in FIG. 5, the leaf spring 506 is attached or secured to each of the links 401a and 401b. In this example, a first end 507a of the leaf spring 506 is clamped using a first pair of clamping elements 503a, which are then inserted in an opening 504a of the link 401a. The first pair of clamping elements 503a (and the first end 507a of the leaf spring 506) are attached or secured to the link 401a using a mechanical fastener or other removable connection technique. In some embodiments, the opening 504a is tapered or otherwise shaped such that when clamping elements 503a are inserted, the opening 504a retains the first pair of clamping elements 503a and may also provide at least a portion the clamping force on the first end 507a. The opening 504a may also include a snap-fit, press-fit or other feature for retaining the first pair of clamping elements 503a. In some implementations, the first pair of clamping elements 503a are attached to the link 401a using an adhesive, weld, or other semi-permanent attachment connection technique. Similarly, the second end 507b of the leaf spring 506 is attached or secured to the link 401b using a second pair of clamping elements 503b inserted into the opening 504b.

The leaf spring 506 may be configured to provide a predetermined amount of biasing force between links 401a, 401b. In this example, the leaf spring 506 is includes a slight fold or crease that angles each end 507a, 507b in a downward direction (as viewed from the perspective of FIG. 5). The shape and compliant resistance provided by the leaf spring 506 may create a biasing torque between adjacent links 401a and 401b in the direction indicated by arrows 508.

In some implementations, the amount of biasing torque between adjacent links 401a, 401b may be adjusted by varying the material, size, shape, thickness and/or angle of the fold in leaf spring 506. Thus, leaf springs having different characteristics may be used between adjacent links 401a, 401b to exert a different biasing torque. With respect to the example of FIG. 4, each group of links 403, 404, 405 may have a pivotal connection having a different leaf spring configured to produce a different biasing torque.

In some embodiments, the amount of biasing toque may be adjusted. For example, a person or machine may replace leaf spring 506 with a different size leaf spring having different characteristics. In some implementations, an additional leaf spring may be added to increase the biasing torque provided between the adjacent links 401a, 401b. In some implementations, a mechanical adjustment may be used (using a preloading screw or similar technique) to increase or decrease the preload on the leaf spring 506, which may also alter the biasing torque between the adjacent links 401a, 401b.

Figure 6:
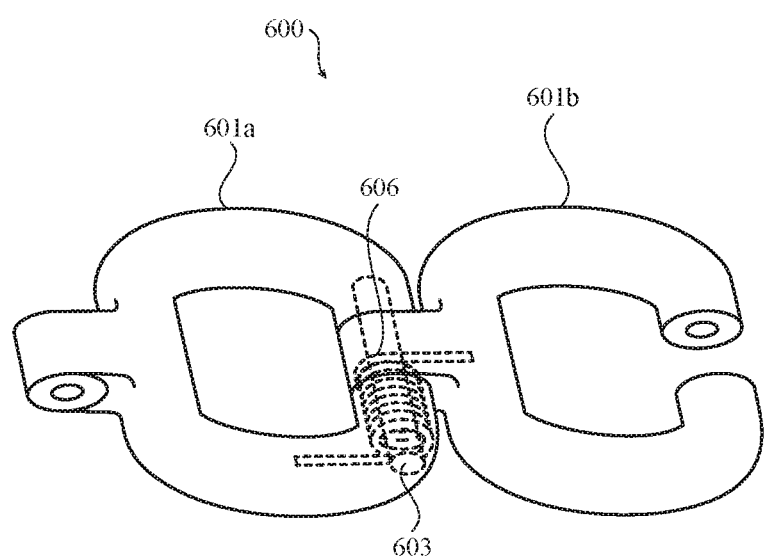
FIG. 6 shows a view of links of a pivotal connection including a torsional spring.

FIG. 6 depicts an alternate embodiment of a pivotal connection 600 between adjacent links 601a and 601b. In this example, a torsion spring 606 is used to provide the biasing torque between the adjacent links 601a and 601b. The size and tension of torsion spring 606 may determine the amount of torque exerted between the adjacent links 601a and 601b. In this embodiment, the torsion spring 606 is at least partially disposed about a pivot pin 603 used to couple the links 601a and 601b. Thus, in this example, the pivotal connection 600 is accomplished using two components, the torsion spring 606 and the pivot pin 603.

The amount of biasing torque between the links 601a and 601b may be adjusted or configured using a variety of techniques. In some implementations, the torsion spring 606 may be replaced with a different torsion spring having a different wire diameter, number of wraps, or leg configuration to produce a pivotal connection 600 having a different biasing torque. Additionally or alternatively, a mechanical adjustment may be used (using a preloading screw or similar technique) to adjust the position of one or more of the legs of the torsion spring 606, which may also alter the biasing torque of the pivotal connection 600.

While FIGS. 5 and 6 depict example configurations used to create a pivotal connection between links, other configurations may be used. For example, another type of spring and/or a magnetic coupling may be used to produce a biasing coupling between the links. In some embodiments, the pivotal connection includes multiple biasing or spring members to produce the biasing torque. Additionally or alternatively, the pivotal connection may include one or more dampening elements or mechanisms for restricting motion between adjacent links.

Figure 7:
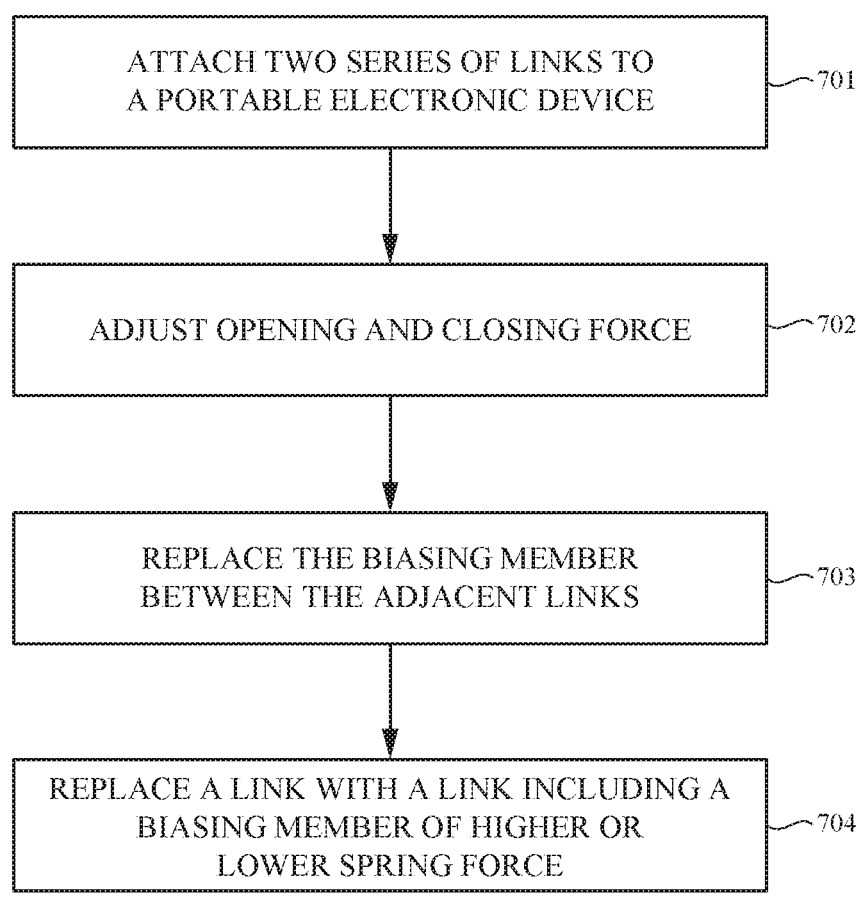
FIG. 7 is a flow chart illustrating a method for attaching a wristband to a user.

FIG. 7 depicts a flow chart of an example process 700 for assembling and adjusting an example attachment mechanism or wristband. In operation 701, a user may select a wristband including two series of links and attach the series of links to a portable electronic device, such as a watch. In some embodiments, the series of links may already be attached to the portable electronic device. In operation 702, the user may adjust the opening and closing forces of the series of links. In one embodiment, this is accomplished in operation 703 by disassembling adjacent links and replacing the biasing member between the adjacent links with one of having a higher or lower spring force. In one alternative embodiment, operation 704 may be used to adjust biasing torque between links. In operation 704, the user may replace a link (or pair of links) with another links (or pair of links) which includes a biasing member having a higher or lower spring force. One or more operations of process 700 may be repeated until the desired fit is achieved.

Figure 8:
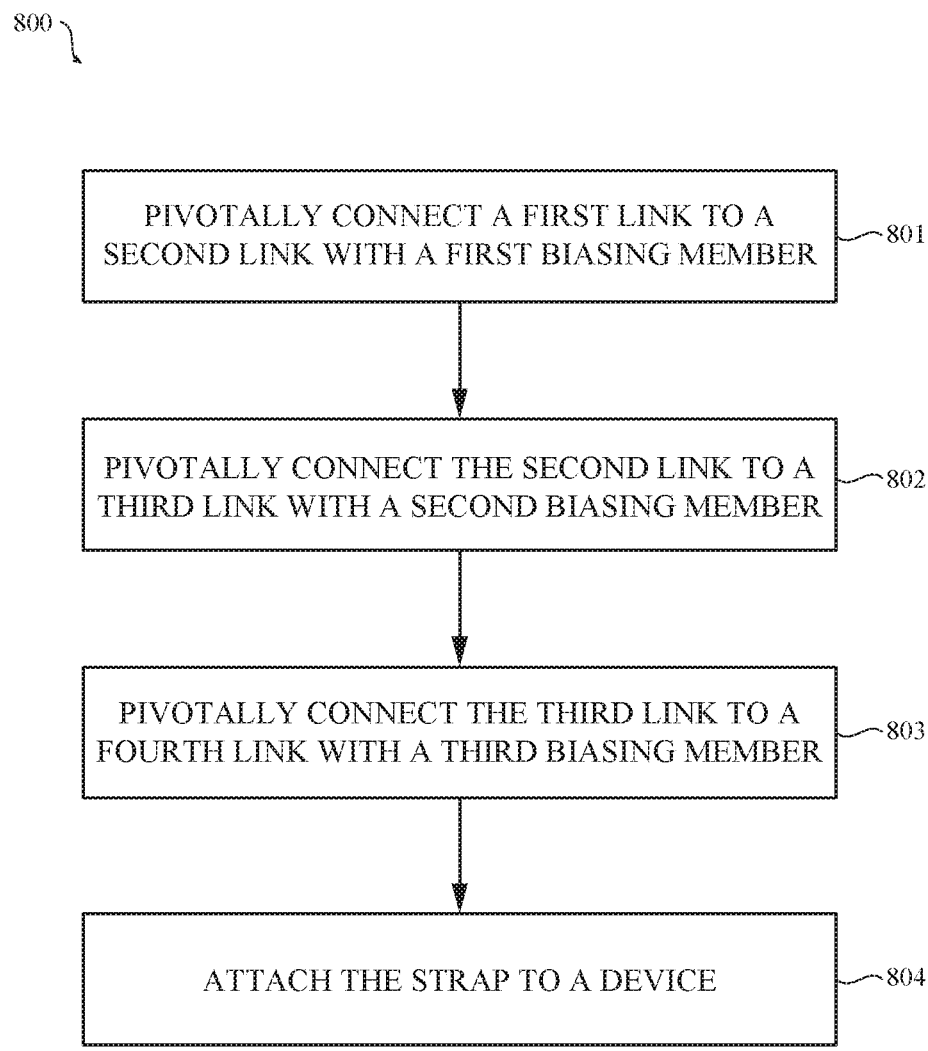
FIG. 8 is a flow chart illustrating a method for manufacturing a wristband.

FIG. 8 depicts a flow chart depicting an example process 800 for assembling an attachment mechanism. In operation 801, a first link is pivotally connected to a second link with a first biasing member. In operation 802, a second link is pivotally connected to a third link with a second biasing member. In operation 803 the third link is pivotally connected to a fourth link with a third biasing member. Operations 801, 802 and 803 may be repeated in order to assemble a band with the desired number of links.

Referring again to FIG. 8, in each of operations 801, 802 and 803 the step of pivotally connecting may include selecting a biasing member with a spring force which either increases or decreases from one link to an adjacent link or which remains the same for a number of adjacent links and then changes. In operation 804, the strap may be attached to a portable electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A band for a wearable electronic device comprising:
   a pair of band straps configured to attach to a housing of the wearable electronic device and configured to transition between an open position and a closed position to secure the wearable electronic device to a user, each band strap comprising:
      a first group of links configured to attach to the housing and comprising:
         a first pivotal connection coupling a first pair of links and including a first biasing member configured to exert a first biasing torque between the first pair of links; and
      a second group of links attached to the first group of links and comprising:
         a second pivotal connection coupling a second pair of links and including a second biasing member configured to exert a second biasing torque that is less than the first biasing torque.

2. The band of claim 1, wherein the first pivotal connection comprises:
   a leaf spring that is configured to bend an provide a pivoting motion between the first pair of links;
   a first pair of clamps attaching a first end of the leaf spring to a first link of the first pair of links; and
   a second pair of clamps attaching a second end of the leaf spring the a second link of the first pair of links.

3. The band of claim 1, further comprising:
   a third group of links attached to the second group of links and comprising:
      a third pivotal connection coupling a third pair of links and including a third biasing member configured to exert a third biasing torque that is less than the second biasing torque.

4. The band of claim 1, wherein:
   each band strap of the pair of band straps is configured to attach to the housing at a fixed end; and
   each band strap is configured to wrap around a wrist of the user at a free end.

5. The band of claim 4, wherein:
   when the band is in the closed position, free ends of the pair of band straps define a gap.

6. The band of claim 1, wherein:
   the first pivotal connection comprises a pivot pin joining the first pair of links; and
   the first biasing member comprises a torsional spring disposed partially about the pivot pin and coupled to each link of the first pair of links.

7. The band of claim 1, wherein:
   the first biasing member includes a leaf spring;
   the leaf spring is coupled to each of the first pair of links and is configured to bend in response to a pivoting motion between the first pair of links; and
   the bending of the leaf spring produces the first biasing torque.

8. The band of claim 7, further comprising:
   a pair of clamping elements that clamp to a first end of the leaf spring; wherein
   the pair of clamping elements attach the first end of the leaf spring to one link of the first pair of links.

9. The band of claim 1, wherein each link is formed from a closed loop of tubular material.

10. The band of claim 1, wherein, for a first band strap of the pair of band straps, each link is coupled using a biasing member configured to exert a biasing torque that is different than other biasing members of the first band strap.

11. The band of claim 1, wherein one or both of the first and second pivotal connections are removable.

12. A wearable electronic device comprising:
   a device housing;
   a display positioned within the device housing;
   a pair of band straps attached to the housing, each band strap comprising:
      a first link pivotally attached to the device housing using a first pivot and a first biasing member;
      a group of intermediate links pivotally engaged with the first link; and
      a second link pivotally engaged with the group of intermediate links using a second pivot and a second biasing member, wherein the first biasing member is configured to exert a first torque that is greater than a second torque of the second biasing member.

13. The wearable electronic device of claim 12, wherein:
the pair of band straps are configured to move between an open position and a closed position; and
the first biasing member and the second biasing member are configured to bias the pair of band straps toward the closed position.

14. The wearable electronic device of claim 12, wherein:
the first link is coupled to the device housing using a toggling pivot;
the toggling pivot is configured to bias the pair of band straps toward an open position when positioned past an opening threshold; and
the toggling pivot is configured to bias the pair of band straps toward a closed position when positioned past a closing threshold.

15. The wearable electronic device of claim 14, wherein:
each link of the pair of band straps is joined to an adjacent link using the toggling pivot;
the toggling pivots are configured to bias the pair of band straps toward the open position when positioned past an opening threshold; and
the toggling pivots are configured to bias the pair of band straps toward the closed position when positioned past a closing threshold.

16. The wearable electronic device of claim 12, wherein the wearable electronic device is an electronic watch configured to function as a timekeeping device.

* * * * *

UNITED STATES PATENT AND TRADEMARK OFFICE
CERTIFICATE OF CORRECTION

PATENT NO. : 9,924,766 B2
APPLICATION NO. : 15/258127
DATED : March 27, 2018
INVENTOR(S) : Daniele de Iuliis et al.

Page 1 of 1

It is certified that error appears in the above-identified patent and that said Letters Patent is hereby corrected as shown below:

In the Claims

In Column 12, Line 7, replace "an" with --and--.

Signed and Sealed this
Thirty-first Day of July, 2018

Andrei Iancu
*Director of the United States Patent and Trademark Office*